(12) United States Patent
Auerbach

(10) Patent No.: US 6,734,645 B2
(45) Date of Patent: May 11, 2004

(54) ELECTRIC POWERED VEHICLE

(76) Inventor: Seymour Auerbach, 115 Hesketh St., Chevy Chase, MD (US) 20815

( * ) Notice: Subject to any disclaimer, the term of this patent is extended or adjusted under 35 U.S.C. 154(b) by 0 days.

(21) Appl. No.: 10/302,838

(22) Filed: Nov. 25, 2002

(65) Prior Publication Data

US 2003/0122512 A1 Jul. 3, 2003

Related U.S. Application Data

(60) Provisional application No. 60/332,553, filed on Nov. 26, 2001.

(51) Int. Cl.$^7$ ................................................ H02P 1/54
(52) U.S. Cl. ...................... 318/139; 318/34; 318/41; 318/45; 318/9
(58) Field of Search .......................... 318/139, 9, 34, 318/41, 46, 106

(56) References Cited

U.S. PATENT DOCUMENTS

| | | |
|---|---|---|
| 778,133 A | 12/1904 | Keates |
| 1,156,594 A | 10/1915 | Fiscus |
| 1,469,264 A | 10/1923 | Lübeck |
| 1,562,903 A | 11/1925 | Miller |
| 3,497,026 A | 2/1970 | Calvert ........................ 180/65 |
| 3,530,356 A | 9/1970 | Aronson ...................... 320/61 |
| 3,559,027 A | 1/1971 | Arsem ......................... 320/61 |
| 3,621,930 A | 11/1971 | Dutchak ................... 180/65 R |
| 3,845,835 A | 11/1974 | Petit ........................ 180/65 R |
| 3,861,487 A | 1/1975 | Gill .......................... 180/65 R |
| 3,880,250 A | 4/1975 | Emanuele |
| 3,921,746 A | 11/1975 | Lewus |
| 3,939,935 A | 2/1976 | Gill |
| 3,972,380 A | 8/1976 | Hudson et al. |
| 3,981,204 A | 9/1976 | Starbard |
| 4,024,924 A | 5/1977 | Houck |
| 4,032,829 A | 6/1977 | Schenavar |
| 4,095,665 A | 6/1978 | Armfield ................... 180/68 D |
| 4,119,862 A | 10/1978 | Gocho |
| 4,141,425 A | 2/1979 | Treat ...................... 180/65 DD |
| 4,218,624 A | 8/1980 | Schiavone .................... 200/45 |
| 4,222,450 A | 9/1980 | Fobbs ........................ 180/65 D |
| 4,270,622 A | 6/1981 | Travis ....................... 180/65 C |
| 4,477,764 A * | 10/1984 | Pollard ......................... 320/116 |
| 4,496,016 A | 1/1985 | Unsworth et al. .......... 180/53.6 |
| 4,597,463 A * | 7/1986 | Barnard ....................... 180/165 |
| 4,602,694 A | 7/1986 | Weldin ........................ 180/2.2 |
| 4,928,227 A * | 5/1990 | Burba et al. ................... 701/66 |
| 5,064,013 A | 11/1991 | Lenz .......................... 180/65.3 |
| 5,224,563 A | 7/1993 | Iizuka ....................... 180/65.3 |
| 5,287,772 A * | 2/1994 | Aoki et al. .................... 477/20 |
| 5,680,908 A | 10/1997 | Reed .......................... 180/65.3 |
| 5,762,161 A | 6/1998 | Caires et al. ............... 180/165 |
| 5,839,529 A * | 11/1998 | DePaoli ...................... 180/65.1 |
| 5,878,134 A | 3/1999 | Handelman et al. ............ 380/4 |
| 5,890,555 A * | 4/1999 | Miller ........................ 180/65.7 |
| 5,921,334 A | 7/1999 | Al-Dokhi ...................... 180/2.2 |
| 5,986,416 A * | 11/1999 | Dubois ......................... 318/139 |
| 6,082,476 A | 7/2000 | Stulbach ..................... 180/65.3 |
| 6,111,375 A | 8/2000 | Zenobi ......................... 318/376 |
| 6,140,780 A | 10/2000 | Oshima et al. .............. 318/139 |
| 6,158,537 A | 12/2000 | Nonobe ....................... 180/65.3 |
| 6,220,381 B1 | 4/2001 | Damron et al. ............ 180/65.3 |
| 6,639,408 B2 * | 10/2003 | Yudahira et al. ............ 324/434 |

* cited by examiner

Primary Examiner—Rita Leykin
(74) Attorney, Agent, or Firm—Nixon & Vanderhye, P.C.; Richard G. Besha

(57) ABSTRACT

In an electrically driven automobile, a dynamo-electric generating device(s) is attached to one or more free-running wheels of the vehicle, which are not connected to the power drive of the vehicle. The free-running wheels are rotated by contact with the road surface as the vehicle is powered forward. The free-running wheels rotate one or more electric generating devices to produce electrical energy which is stored alternately in one or more electrical storage systems. The other non-charging electrical storage system(s) concurrently provides power to the electric motor which drives the vehicle through one or more of the wheels connected to the power train.

19 Claims, 8 Drawing Sheets

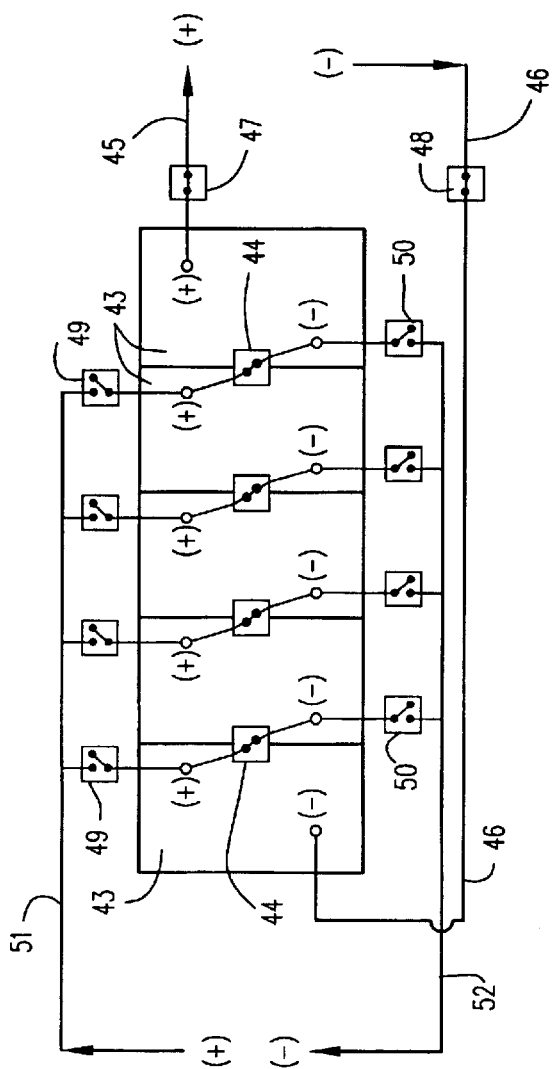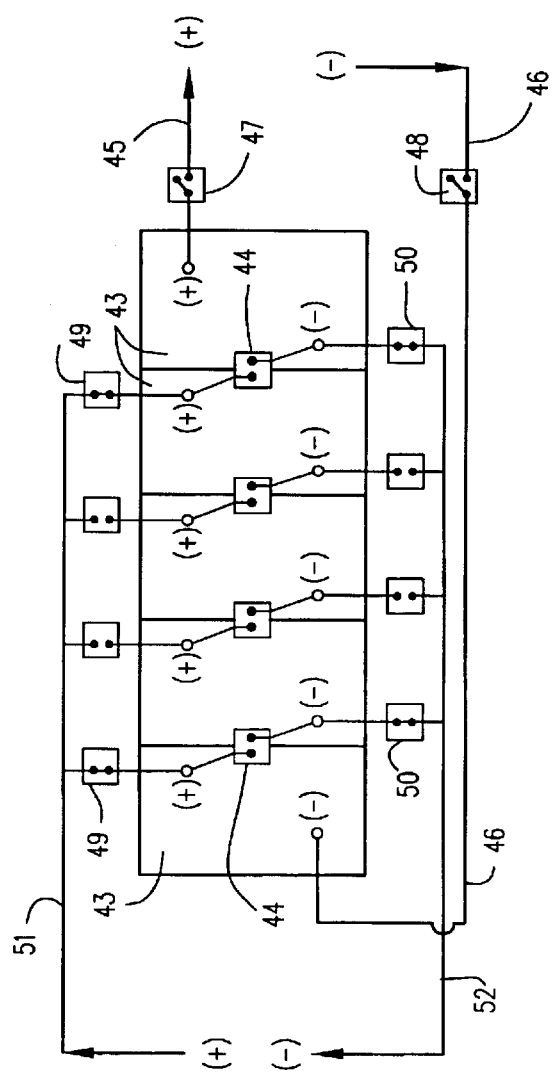

ELECTRIC POWERED VEHICLE

RELATED APPLICATION

This application is based on U.S. provisional application Serial No. 60/332,553, filed Nov. 26, 2001, the disclosure of which is incorporated herein by reference.

BACKGROUND OF THE INVENTION

The present invention relates to an electric motor driven vehicle having at least two electrical energy storage packs, an electric motor, an electrical generating device, e.g., an electric generator or alternator, and switches to provide a source of electric power to the motor from one or the other electrical energy storage packs while the non-power providing storage pack is being recharged and methods of operation.

With the growing concern over air pollution, petroleum shortages and other problems associated with gasoline, natural gas, diesel or other fossil fuel powered vehicles, the automobile industry is in the throes of devising power systems which are increasingly less dependent upon the combustion engine. There are at least two relevant alternatives presently available. One is a purely electric powered vehicle which, as presently designed and marketed, requires recharging from outside sources at frequent intervals. The other is the so-called hybrid vehicle which has both an electrical motor and a gasoline reciprocal engine; the one augmenting the other to produce greater mileage, and therefore less pollution, per unit of gasoline consumption. There is a third, the hydrogen fuel cell powered vehicle, the efficaciousness of which is not yet proven.

Efforts to improve the self sufficiency of the purely electric powered automobile have produced a number of different designs, none of which promise to minimize or eliminate the necessity of frequent intermittent outside charging of their electrical storage cells or significantly reduce the frequency of charging from an outside source. Certain designs rely upon an electric motor driving an electric generator through selective gear and clutch mechanisms. See, for example, Armfield U.S. Pat. No. 4,095,665 and Fobbs, U.S. Pat. No. 4,222,450. Other designs provide a generator powered directly by a free-running wheel. See, for example, Unsworth, U.S. Pat. No. 4,496,016. However, such designs do not disclose circuitry including battery packs which are separately charged and separately supply electric power to the vehicle. Still other designs provide electrical power generation by an independent fifth, free-running wheel. These designs, however, either do not provide circuit connection with electric storage packs nor do they demonstrate direct connection to a battery pack separably independent of another battery pack providing electric power to the motor. See, for example, Al-Dokhi, U.S. Pat. No. 5,921,334. Certain further designs demonstrate charging of battery packs through regenerative action of braking wheels or coasting free-running wheels while the motor or engine is idling; none of them demonstrate an ability to provide sufficient electrical generation to minimize the frequency of recharging from an external source. Prior designs, to applicant's knowledge, do not demonstrate a method of charging an electrical storage pack which is independent of the driving motor in a disconnected manner and which maintains the entirety of the electrically powered drive system independent of the electrical charging system.

BRIEF DESCRIPTION OF THE INVENTION

In accordance with a preferred embodiment of the present invention, an electrical powered vehicle recharges its electrical power storage packs by means of an electrical generating device such as a generator or alternator connected to one or more free-running wheels which is rotated by contact with the roadway, independent of the vehicle's power train and powered wheels. At least two electrical storage packs are provided and a switch alternately connects the generating device to the depleted electrical storage pack, which is simultaneously disconnected from the electric motor, at the same time connecting the fully charged electrical storage pack to provide power to the electric motor which drives the vehicle.

In alternate configurations, this invention may have more than one electrical generating device connected to more than one free-running wheel, and may have a plurality of electrical storage packs along with appropriate switches.

Preferably, the invention includes a plurality of battery packs, one or more electrical generating devices connected to one or more free-running wheels, one or more electric motors powered by one or more, but not all, of the battery packs, all of which are controlled by a management and distribution system with sensors situated to inform the management system of the need for power generation and distribution as the needs for power storage and power supply may vary.

Any of the embodiments of this invention may also include electrical power collection from regenerative sources such as from the electric motor when it is in a braking mode and which motor converts to a generator (i.e. when the vehicle is in a descending attitude and the powered wheels rotate the motor). Furthermore, the system may include a battery-pack recharging system whereby the individual cells (or separate batteries) in the battery pack(s) are charged when in a parallel electrical circuit and are switched into a series electrical circuit when the battery pack is powering the vehicles electric drive motor. The vehicle may also include other external electrical power supply sources such as photo-voltaic cells or provision for direct charging from an external electrical power source.

In accordance with a preferred embodiment of the present invention, there is provided an electric motor driven vehicle with an electrical system having at least two electrical storage packs, one of which is recharged by one or more of free-running wheels while the other, already charged battery pack, powers the electric motor to drive the vehicle. Ample electrical power to alternating battery packs is provided to maintain a predetermined magnitude of electrical energy to power the electric drive motor.

In a preferred embodiment according to the present invention, there is provided a power-generating system for an electric-powered vehicle having at least a pair of wheels, comprising at least first and second discrete battery packs for storing electrical energy, an electrical generating device coupled to at least one of the wheels of the vehicle for generating electricity in response to rotation of the one wheel, an electric motor connected to another of the wheels for driving the another wheel, discrete battery-charging electrical circuits coupling the generating device and the battery packs, including a first switch for selectively charging the first and second battery packs through the discrete battery charging electrical circuits, respectively, discrete electrical driving circuits coupled to the electric motor and the battery packs, including a second switch for electrically driving the motor using stored electrical energy (i) from the first battery pack when the first switch connects the generating device and the second battery pack and the second switch connects the motor and the first battery pack and (ii)

from the second battery pack when the first switch connects the generating device and the first battery pack and the second switch connects the motor and the second battery pack, respectively.

In a further preferred embodiment according to the present invention, there is provided a power-generating system for an electric-powered vehicle having at least a pair of wheels, comprising at least first and second discrete battery packs for storing electrical energy, an electrical generating device coupled to at least one of the wheels of the vehicle for generating electricity in response to rotation of the one wheel, an electric motor connected to another of the wheels for driving the another wheel, discrete battery-charging electrical circuits coupling the generating device and the battery packs, including a first switch for selectively charging the first and second battery packs through the discrete battery charging electrical circuits, respectively, discrete electrical driving circuits coupled to the electric motor and the battery packs, including a second switch for electrically driving the motor using stored electrical energy from a selected one of the battery packs and means for alternating between (i) charging one of the first and second battery packs and powering the electric motor using stored electrical energy from another of the first and second battery packs and (ii) charging the another of the first and second battery packs and powering the electrical motor using stored electrical energy from the one of the first and second battery packs.

In a further preferred embodiment according to the present invention, there is provided a power generating system for an electric-powered vehicle having at least a pair of wheels, comprising at least first and second discrete battery packs for storing electrical energy, an electrical generating device coupled to at least one of the wheels of the vehicle for generating electricity in response to rotation of the one wheel, an electric motor connected to another of the wheels for driving the another wheel, discrete battery-charging electrical circuits coupling the generating device and the battery packs for selectively charging the first and second battery packs through the discrete battery charging electrical circuits, respectively, discrete electrical driving circuits coupled to the electric motor and the battery packs for electrically driving the motor using stored electrical energy selectively from the first and second battery packs, each selected battery-charging circuit being electrically independent of each selected electrical driving circuit affording electrical disconnection between the electrical generating device and the electric motor when powering the vehicle.

In a further preferred embodiment of the present invention, there is provided a method of powering a vehicle comprising the steps of (a) electrically connecting at least one of a plurality of discrete battery packs having stored electrical energy to an electric motor to drive a wheel of a vehicle and thereby drive the vehicle, (b) generating electrical energy in an electrical generating device in response to rotation of another wheel of the vehicle, (c) electrically connecting the electrical generating device to a battery pack different than the battery pack in electrical connection with the electric motor to charge the different battery pack, (d) electrically disconnecting the one battery pack and the electric motor, (e) electrically connecting another of the battery packs to the electric motor to drive the wheel of the vehicle and thereby drive the vehicle, (f) electrically disconnecting the electrical generating device from the different battery pack, (g) electrically connecting the electrical generating device with the one battery pack to charge the one battery pack and (h) electrically connecting and disconnecting the battery packs and the electric motor and electrically connecting and disconnecting the electrical generating device and the battery packs such that the same battery pack is disabled from simultaneously being charged and driving the electric motor.

BRIEF DESCRIPTION OF THE DRAWINGS

FIGS. 5a and 5b are diagrammatic electric drawings illustrating an arrangement whereby the battery packs' cells are arranged in a parallel circuit when being charged and, by a switching system, arranged in series circuit when delivering power to drive the vehicle's electric drive motor;

DETAILED DESCRIPTION OF THE INVENTION

Figure 1:
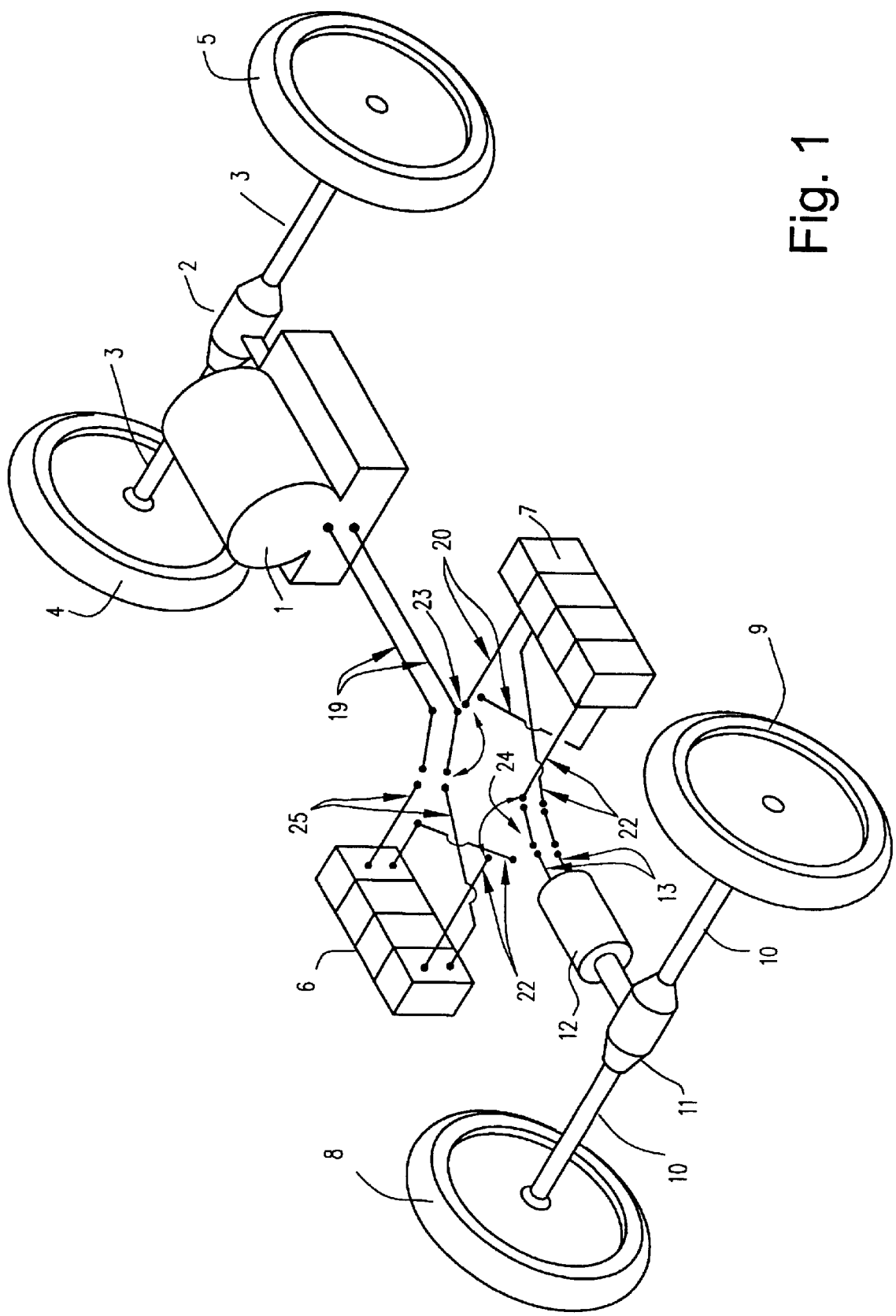
FIG. 1 is a schematic isometric view of a preferred embodiment of the present invention illustrating two battery packs, a generator, a motor, switches and electrical harnesses for power distribution.

In FIG. 1, there is illustrated a vehicle having an electric motor 1 which powers drive-wheels 4 and 5 via a gearbox 2 and a powered axle 3. Battery packs 6 and 7 alternately provide electrical energy to electric motor 1. Battery packs 6 and 7 each receive power, alternately, from an electrical generating device 12 which is driven through a gearbox 11 by axle 10. An adjustable ratio gearbox may be used. Axle 10 is rotated by one or both of free-running wheels 8 and 9. The electric energy produced by electrical generating device 12 is supplied to only one battery pack, for example, battery pack 7, through wiring harnesses 13 and 22 and a switch 24. When switch 24 electrically connects the generating device 12 and the battery pack 7, the generated electrical energy passes through wiring harnesses 13 and 22 to the battery pack 7 where it is stored. Simultaneously, battery pack 6 provides power to the electric motor 1 through wiring harnesses 19 and 21 and a switch 23. When the stored electrical energy in battery pack 6 is depleted to a predetermined amount, switch 23 disconnects the electrical motor 1 from the battery pack 6 and connects electric motor 1, through wiring harnesses 20 and 19, and switch 23 to battery pack 7 which has been charged with electrical energy from generating device 12 through wiring harnesses 13 and 22 and switch 24. Simultaneously, with connecting electric motor 1 and battery pack 7, switch 24 disconnects generating device 12 from battery pack 7 and connects battery pack 6 with the electrical generating device 12 via switch 24 and wiring harnesses 13 and 22a. Sensors (not shown in this drawing Figure) signal the switches to reverse their positions when battery pack 6, powering the electric motor 1, is nearing depletion of its charge and battery pack 7 is recharged and vice-versa. It will be appreciated that the terms "battery pack" or "electrical storage pack" embrace any means of storing electrical energy, such as lead-acid batteries.

When the vehicle is in a balanced mode (i.e. carrying a normal load on a level road surface and not accelerating), the electrical generating device 12 in combination with gearbox 11 provides a magnitude of electrical energy to battery pack 7 while the electrical energy motor 1 draws from battery pack 6; the capacity of generating device 12 being set to provide a predetermined magnitude of energy to battery pack 7. As the speed of the vehicle reduces, an electric or mechanical signal is sent to the gearbox 11 which changes the gear ratio to increase the rotational speed of generator 12 to maintain a predetermined electrical input to battery pack 7. The same is true when battery pack 6 forms part of the battery charging circuit and battery pack 7 forms part of the driving circuit.

Therefore, in one mode, the discrete battery charging circuit includes free-running wheels 8 and 9, axle 10, gearbox 11, electrical generating device 12, harnesses 13 and 22 along with switch 24 electrically connecting generating device 12 to the charging battery 7 through electrical harness 22. In that same mode, the vehicle driving circuit includes the powering battery pack 6, wiring harnesses 21 and 19 and switch 23 connecting battery pack 6 to the electric motor 1 which drives the drive wheels 4 and 5 through a preferred adjustable ratio gearbox 2 and axles 3. The discrete charging and driving electrical circuits are thus separate from one another. Similarly, in a second mode with switches 23 and 24 reversed from the position illustrated, the driving circuit includes harnesses 19 and 20, switch 23 and battery pack 7, whereas the charging circuit includes harnesses 13 and 22a, switch 24 and battery pack 6. The switches 23 and 24 prevent the electrical generating device 12 from supplying electric power directly to the motor 1. That is, motor 1 draws electrical energy from only one of battery packs 6 and 7 while the other of the battery packs is being electrically charged by generating device 12.

Figure 2:
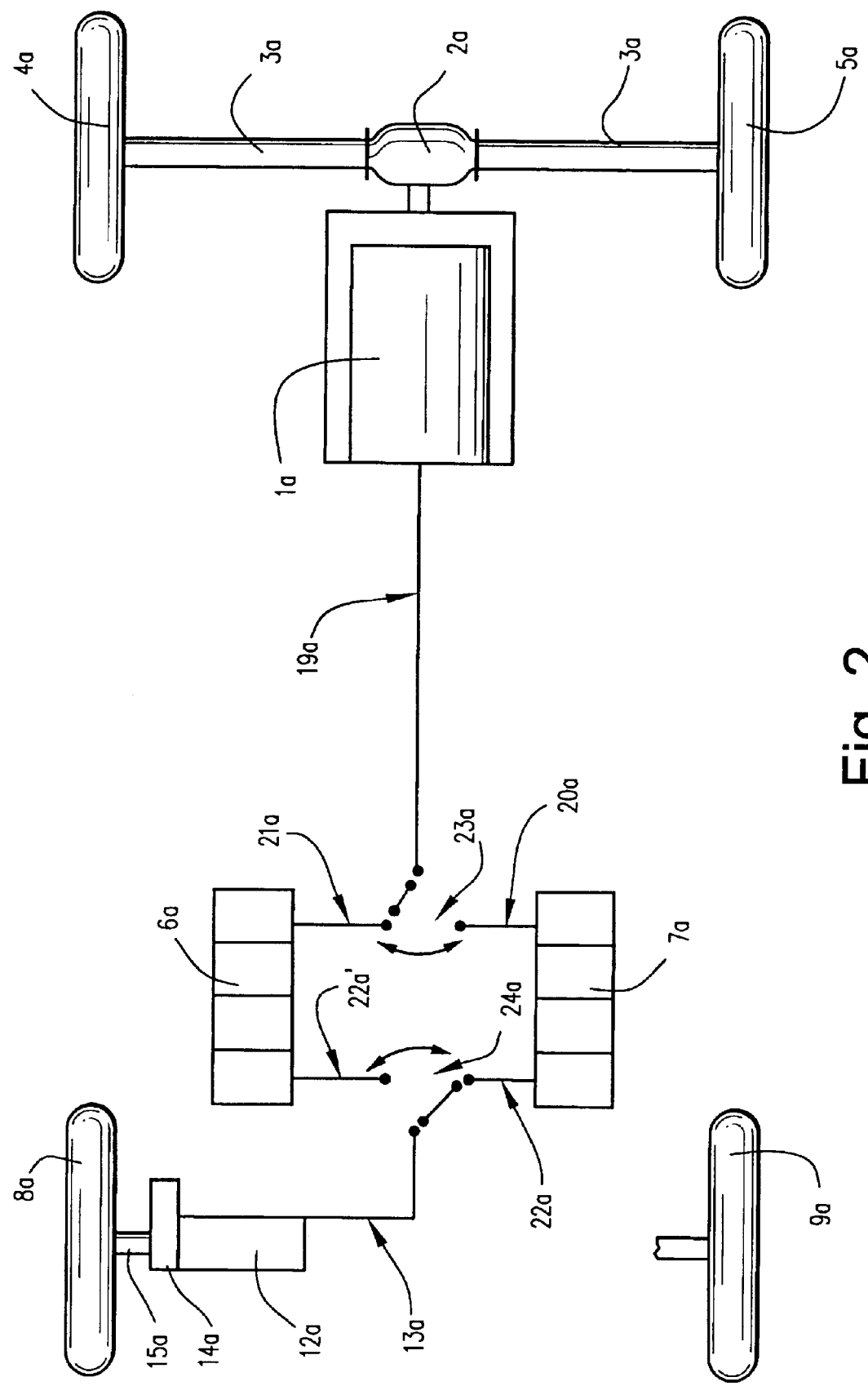
FIG. 2 is a schematic plan view of another embodiment of the present invention, similar to that shown in FIG. 1, and in which the generating device is driven by only one free-running wheel and which the positive and negative circuits of the power distribution harnesses are illustrated by a single line.

FIG. 2 illustrates a second embodiment of the present invention wherein like reference numerals as in FIG. 1 are applied to like parts followed by the letter "a". In FIG. 2, an electric motor 1a powers drive-wheels 4a and 5a via gearbox 2a and power axles 3a. Similar to FIG. 1, battery packs 6a and 7a receive power, alternately, from an electrical generating device 12a which is driven through a gearbox 14a by axle 15a which is rotated by a free-running wheel 8a. Free-running wheel 9a in this embodiment of the invention does not provide power to the generating device 12a. The electric energy provided by generating device 12a is conducted through wiring harness 13a and switch 24a to only one of battery packs 6a or 7a via harnesses 22a or 22a'. As illustrated, switch 24a directs the generated electrical energy from generating device 12a to the battery pack 7a where it is stored. Disconnected from the generating device 12a, battery pack 6a provides power to the electric motor 1a through wiring harnesses 21a and 19a and switch 23a. As the stored electrical energy in vehicle-driving battery pack 6a is consumed and power is concurrently stored in battery pack 7a to a predetermined magnitude, switches 24a and 23a are reversed. Generating device 12a then discretely supplies electrical energy through the discrete charging circuit, e.g., harnesses 13a and 22a', and switch 24a, for storage in battery pack 6a while battery pack 7a supplies electrical energy to power motor 1a in a separate discrete driving circuit including harnesses 19a and 20a and switch 23a. Detectors (not shown) signal the switches 24a and 23a to reverse their positions when the battery pack 7a powering the electric motor 1a is nearing depletion of its charge and/or when battery pack 6a has achieved its maximum charge to reverse the discrete charging and driving circuits. Other than having only one free-running wheel 8a as a battery pack charging element, the powering and charging arrangement in FIG. 2 is the same as illustrated in FIG. 1.

Figure 3:
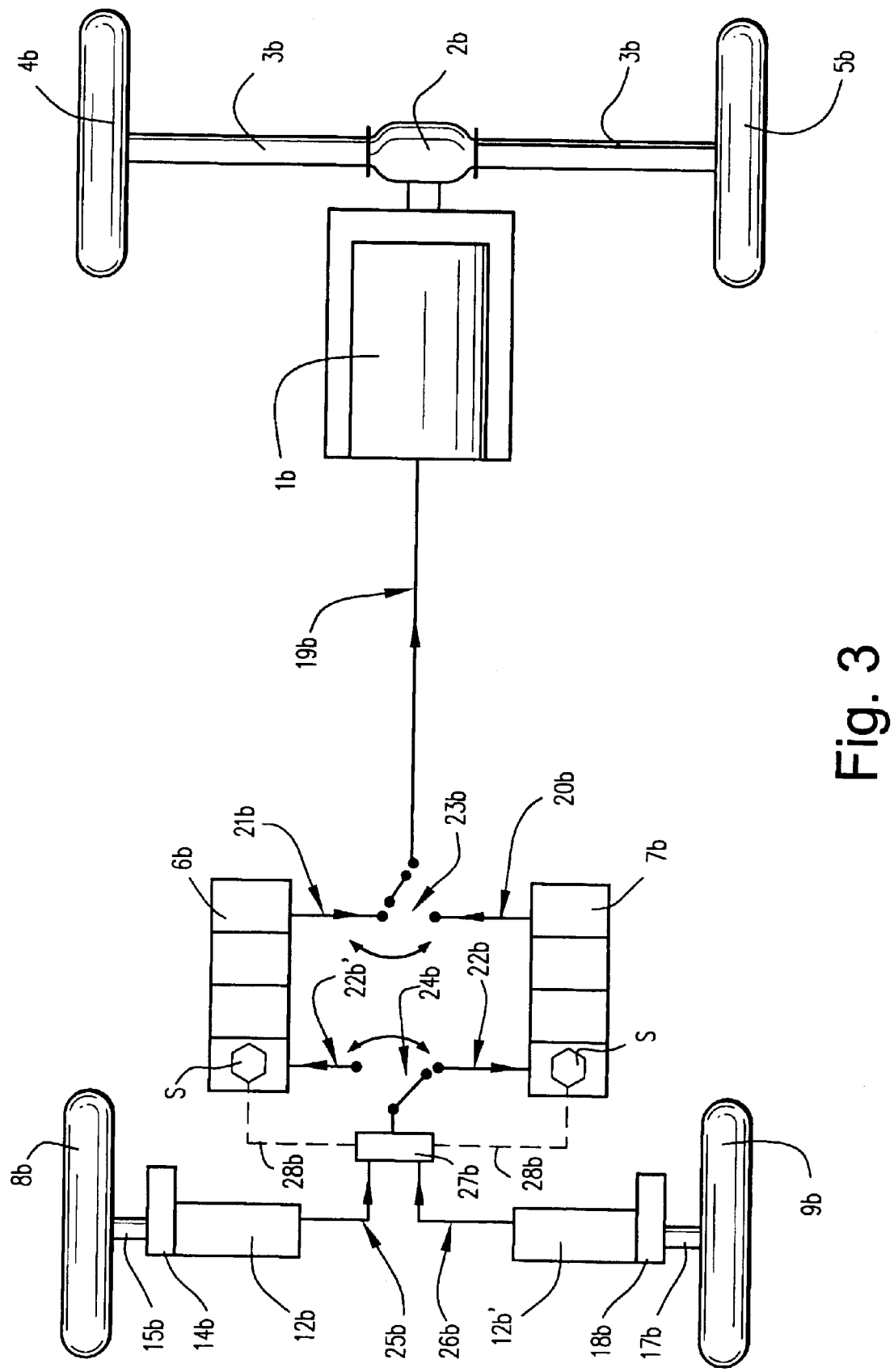
FIG. 3 is a schematic plan view showing a further embodiment of the invention having two battery packs and two generating devices, each driven separately by a free-running wheel and having a computerized or mechanical distribution control device which regulates the amount and direction of flow of generated electrical power.

In the embodiment of FIG. 3 wherein like reference numerals are applied to like parts as in FIG. 2, followed by the letter "b", there are illustrated two generating devices 12b and 12b'. Generating device 12b is rotated by free-running wheel 8b, axle 15b and gearbox 14b, similarly as described in FIG. 2. In this embodiment of the invention, a second generating device 12b, is rotated by free-running wheel 9b, though axle 17b and a gearbox 18b. Sensors S on the battery packs 6b and 7b signal, through wiring harnesses 28b, the magnitude of stored electrical energy in each of the battery packs to a distribution control center 27b. Control center 27b switches between either one or both generating devices 12b and 12b' for supplying electrical energy to the appropriate battery pack 6b or 7b. Control center 27b also adjusts the ratio of, as well as engages or disengages, one or both of the gearboxes 14b and 18b as is required to provide electrical energy to the illustrated non-powering battery pack 7b sufficiently to electrically recharge battery pack 7b for subsequently driving the vehicle when battery pack 7b is employed in the power driving circuit and battery pack 6b is employed in the charging circuit. When the sensor S on the powering battery pack 6b indicates its power supply is diminished to a predetermined level, the distribution control center 27b reverses switches 23b and 24b from the positions illustrated so that the fully charged battery pack 7b provides electrical power to motor 1b via harnesses 20b and 19b and switch 23b as part of an electrical driving circuit for driving the vehicle. Simultaneously, battery pack 6b goes into a recharging mode from the electrical generating devices 12b and 12b', via the control center 27b, switch 24b and wiring harness 22b'. While FIG. 3 illustrates a four-wheel vehicle, it will be appreciated that the disclosed circuitry including the two generating devices 12b and 12b' may be used in conjunction with a three-wheel vehicle having two free wheels driving the respective generating devices and a single drive wheel powered by the electric motor.

Figure 4:
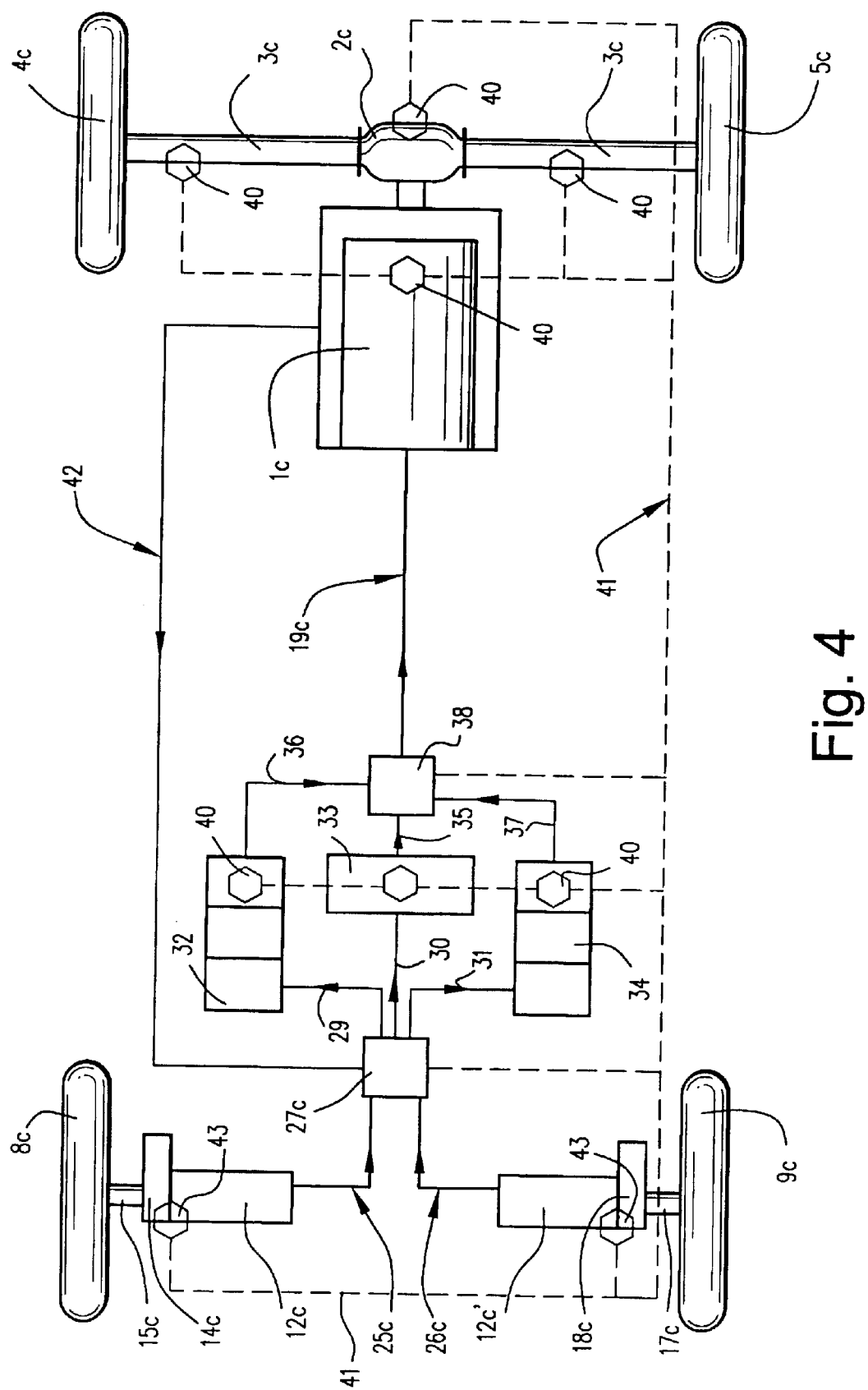
FIG. 4 is a schematic plan view showing a still further embodiment of the invention having two generating devices and three battery packs wherein each of the generating devices supplies energy to two of the three battery packs allowing the electric motor to draw electrical power from either one or two of the battery packs according to its power needs and in which there is a computerized management control system, connected with sensors, which reads and controls the generation, distribution and consumption of electrical power including optional ancillary regenerative power from sources other than the free-running wheels.

In the embodiment of FIG. 4, wherein like reference numerals are applied to like parts as in FIG. 3, followed by the letters "c" and "c'", two generating devices 12c and 12c' are provided similarly as in the previous embodiment illustrated in FIG. 3. In this embodiment, there are three battery packs 32, 33 and 34 which receive generated electrical power from generating devices 12c' and 12c through wiring harnesses 25c and 26c. Harnesses 25c and 26c are connected through a distribution control device 27c which distributes the generated electrical energy to any one or more of three battery packs 32, 33 and 34 through wiring harnesses 29, 30 and 31 as needed. The distribution control device 27c, via control-sensors 43, also engages either one or both of the generating devices 12c and 12c' or adjusts the ratios of gearboxes 14c and 18c as required to recharge the battery packs at a predetermined rate. Stored electrical energy from one or two of the battery packs not being charged by one or both of the generating devices 12c and 12c' is conducted by wiring harnesses 35, 36 and 37 through a computerized management control device 38 and a wiring harness 19c to the electric motor 1c. Motor 1c powers drive wheels 4c and 5c through gearbox 2c and axles 3c. The computerized management control device 38 is connected by wiring harness 41 to an array of sensors 40 which informs the management control device 38 of the need for generated power as required to maintain a predetermined magnitude of stored electrical power. Control device 38 switches the generators and battery packs back and forth as is required to achieve the most economic electrical balance. Some of the sensors 40 positioned on the drive train inform the control device 38 when regenerative power is available from the drive train and/or the electric motor. Control device 38 then directs this regenerative power to one or more of the storage battery packs 32, 33 and 34 so that regenerative kinetic energy is converted into electrical energy and stored. Thus, rather than wasting kinetic energy as in the case of the vehicle, at high speed, descending an incline which causes the drive wheels to rotate the motor in a braking fashion thereby converting the motor into a generator, the generated electrical energy is supplied through wiring harness 42 to the distribution control device 27c to provide additional electrical energy to one or more of the electrical storage battery packs which are in a recharging mode. It is to be understood that regenerative kinetic energy from other sources such as braking of the drive train or free-running wheels may also be directed to distribution control device 27c. It should also be understood that there may be more than three battery packs in similar arrangement.

FIG. 5a (driving circuit) illustrates a battery pack 43 comprised of cells, five being illustrated, (or alternatively, separate batteries) with switches 44 closed so as to electrically connect the battery cells in series to the motor via closed switches 47 and 48. It will be appreciated that in this embodiment, as well as other embodiments, a greater or lesser number of battery cells (or alternatively, separate batteries) may be utilized. Electric power from the battery pack is delivered to the vehicle's electric drive motor (not shown) via wiring harnesses 45 and 46 when switches 47 and 48 are in a closed position. When the electrical delivery circuit is in this configuration, switches 49 and 50 are in an open position so as to disconnect the generating device(s), not shown in this drawing Figure, from battery pack 43.

FIG. 5b (charging circuit) is similar to FIG. 5a except it portrays the switches 44 in an open position disconnecting the battery cells 43 from each other and shows switches 49 and 50 in a closed position thereby connecting the battery cells 43, in parallel electrical circuitry, to a generating device (not shown) via wiring harnesses 51 and 52. Switches 47 and 48 on wiring harnesses 45 and 46, are in an open position thereby disconnecting the battery pack from the vehicle's It is to be understood that a distribution control center (27b as shown in FIG. 3) may be used to modify the electrical aspects of the circuitry as required. It may also be used to control the timing of the switching arrangements illustrated in FIGS. 5a and 5b in such a manner as to avoid arcing, short circuiting, or overheating of the battery cells. Similarly a distribution control device 27c together with a management control device 38 (both as shown in FIG. 4) may be employed to provide the electrical modification and protection to the batteries or battery cells. It also is to be understood that any number of batteries or battery cells may be included in the arrangement shown in FIGS. 5a and 5b. Further, it is to be understood that the battery pack and circuitry arrangements shown in these FIGS. 5a and 5b may be used in combination with any of the embodiments shown in FIGS. 1 through 4 and 6, 7 and 8.

Figure 6B:
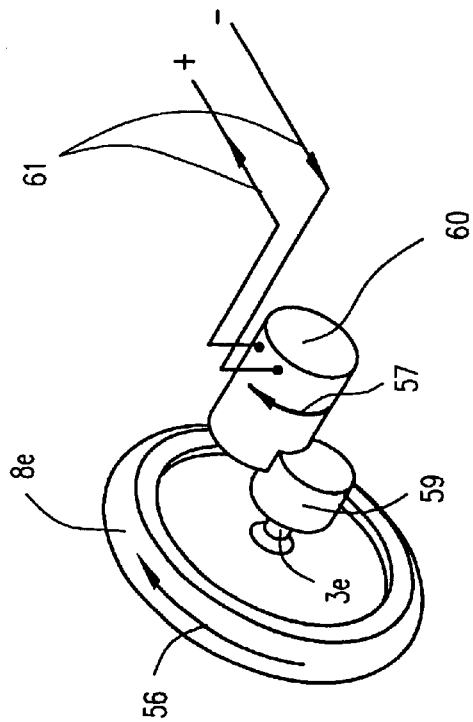
FIGS. 6a and 6b are schematic drawings each showing the use of a constant output-speed gearbox, one driven by two free running wheels and the other driven by only one free running wheel, but in both instances, maintaining a constant rotational speed of the generating device irrespective of the variances of the speed of the free running wheels.
Figure 6A:
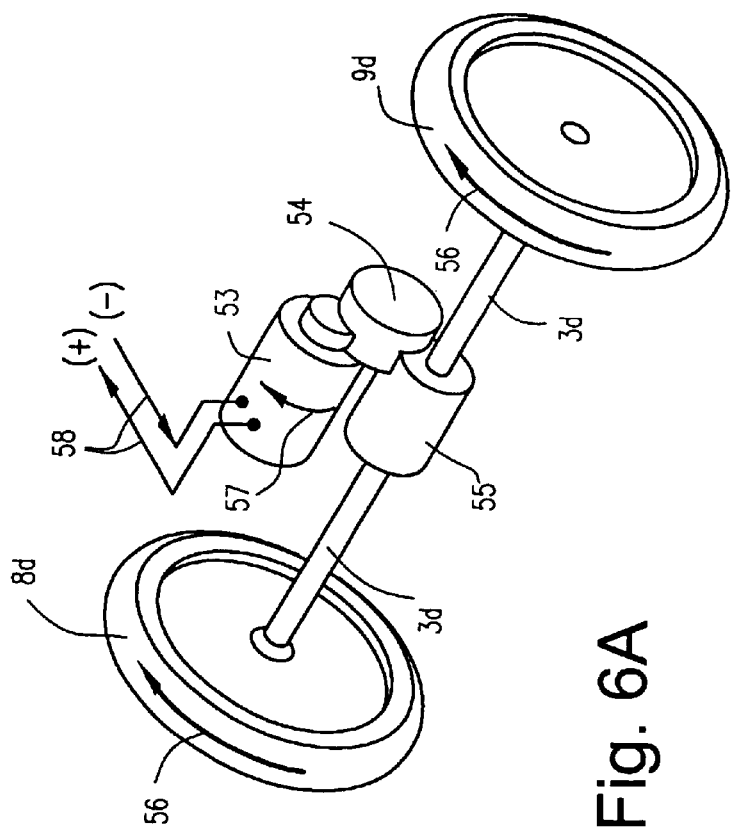

FIG. 6a is an isometric diagram illustrating powering a generating device 53 through a constant output-speed gearbox 54 which is turned by two free running wheels 8d and 9d via axles 3d and a differential gear 55. As the free running wheels 8d and 9d rotate in the direction indicated by arrows 56 at varying rates in relation to the speed of the vehicle, the constant output-speed gearbox 54 delivers and maintains a constant rate of revolution of the generating device 53 as indicated by arrow 57. The generated power is supplied to one or more, but not all, battery packs (not shown) via wiring harness 58 to any of the wiring and power storage systems shown in FIGS. 1 through 4 and 7 and 8. It should also be understood that the constant output-speed gearbox may have a minimum setting below which it disengages from the differential gear so as to eliminate rotational drag in the system and therefore reduce the waste of kinetic energy. It should also be understood that the constant output-speed gearbox may have a maximum setting above which speed it will not rotate, or may disconnect, the generating device so as to prevent the possibility of charging the battery pack(s) to which it is connected at a rate of electric motive power which would harm the battery pack by, as one example, overheating. More typically, this control may be provided by such devices as voltage regulators.

FIG. 6b is an isometric diagram revealing an electric power generator 60 powered by the rotation of one free running wheel 8e via axle 3e and constant output-speed gearbox 59 and delivering power to one or more, but not all, storage battery packs (not shown) via wiring harness 61 to any of the wiring and power storage systems shown in FIGS. 2 through 4 and 7 and 8. This arrangement is identical in all respects with the system depicted in FIG. 6b except that it is driven by only one free running wheel and therefore does not require a differential gear.

Figure 7:
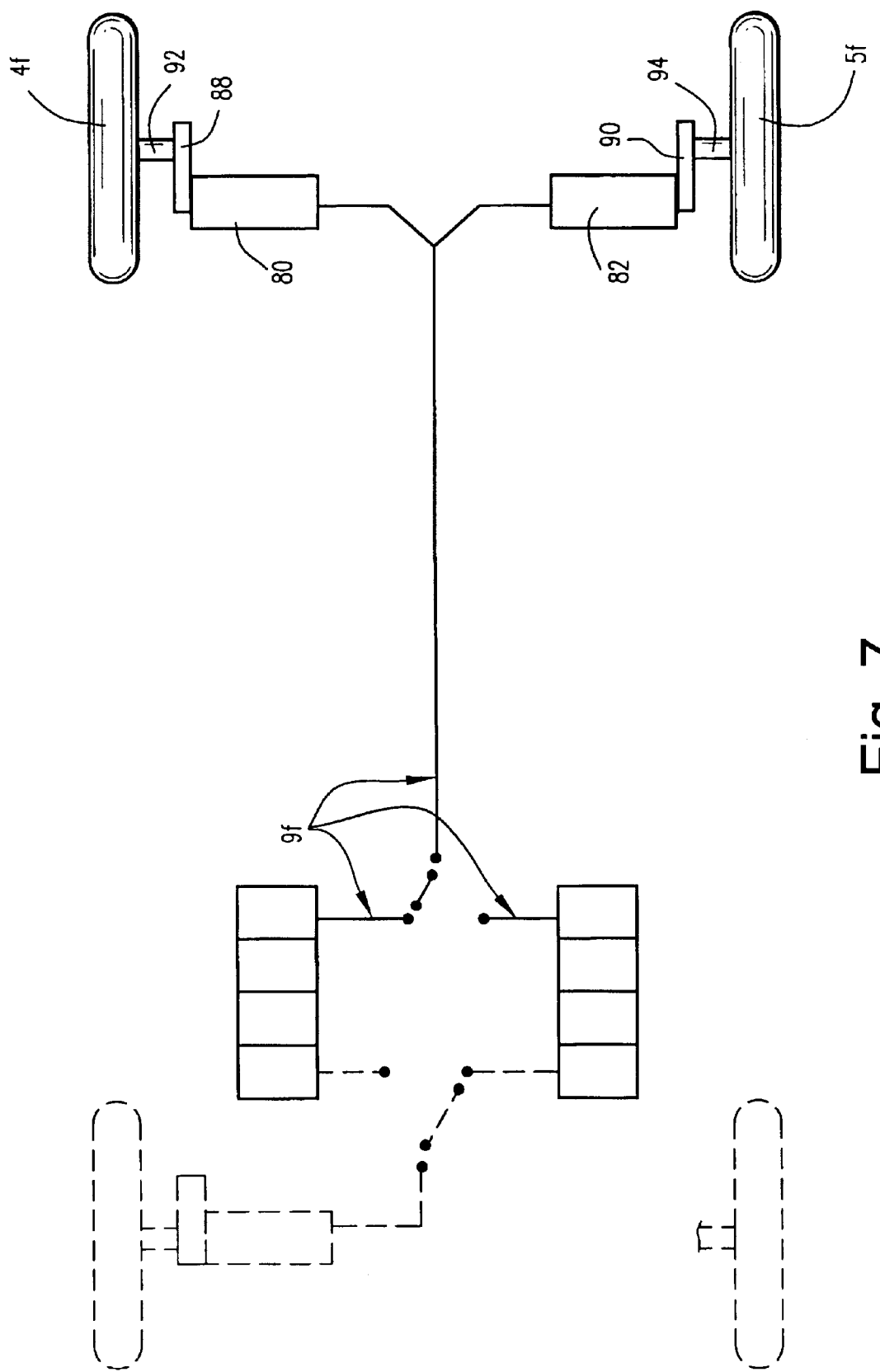
FIG. 7 is a schematic drawing illustrating two electric motors, each separately powering one of two drive wheels.

FIG. 7 illustrates two electric motors 80 and 82 which power wheels 4f and 5f via transmissions 88 and 90 and axles 92 and 94, respectively. The electric motors 80 and 82 receive electrical energy through electric harness 96 which, in this embodiment, is alternately connected to one of two battery packs similarly as represented in FIG. 2. (Other aspects of FIG. 2 are here shown in dashed lines). It is understood that this arrangement of more than one powering electric motor may be used in combination with any of the embodiments shown in FIGS. 1 through 4, 5a and 5b, as well as 6a and 6b and 7 and 8.

Figure 8:
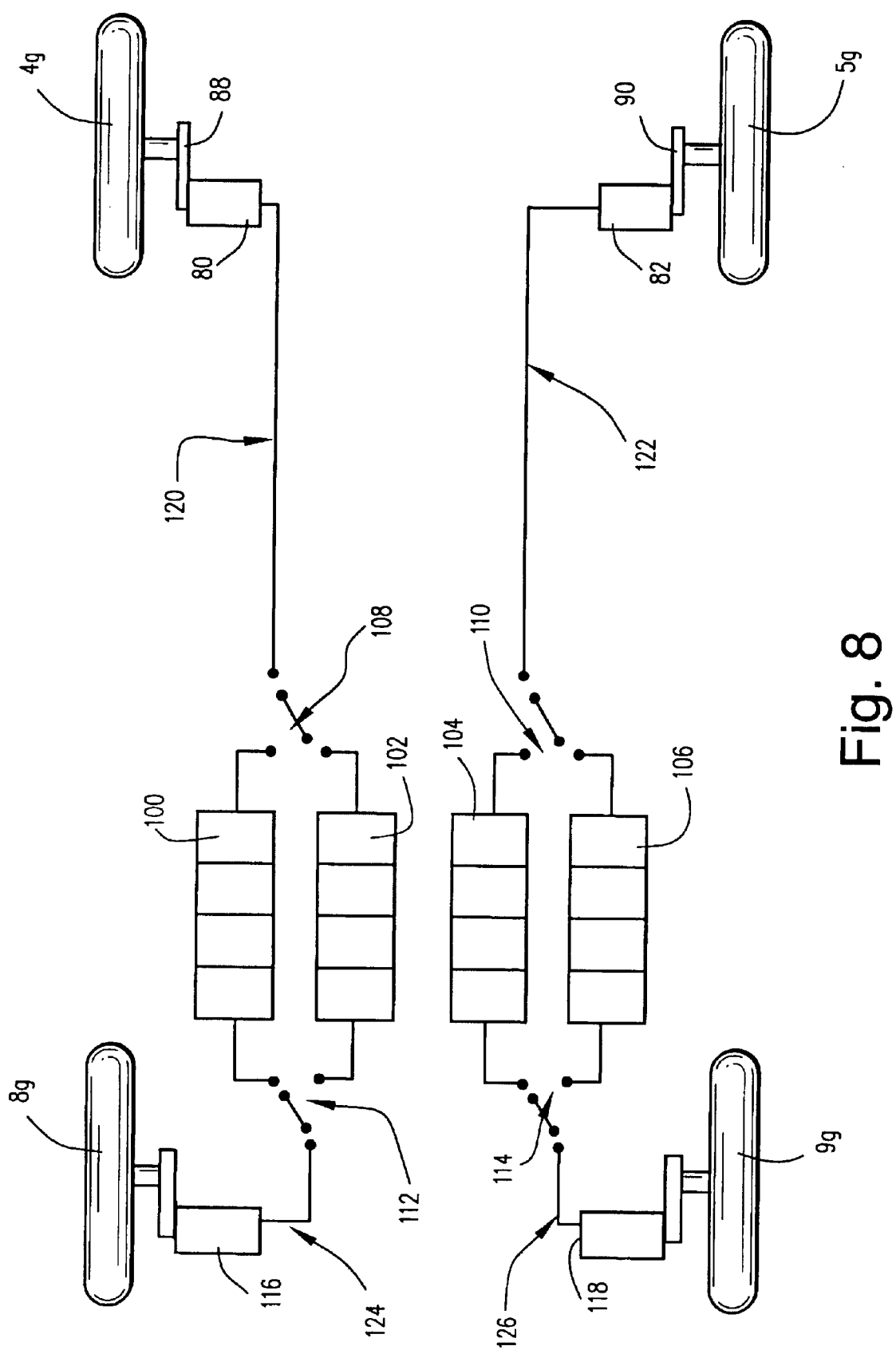
FIG. 8 is a schematic drawing showing four battery packs two each, alternatively, powering one of two electric motors, each of which powers one of two drive wheels.

Referring now to FIG. 8, there are illustrated two electric motors 80 and 82 which power wheels 4f and 5f, respectively, via transmission 88 and 90. The motors 80 and 82 are powered by discrete pairs of battery packs 100, 102 and 104, 106, respectively. Each of the pairs of battery packs has a switch 108 and 110, respectively, for alternately connecting and disconnecting the battery packs of each discrete pair with the associated motor. Similarly as previously described, the pairs of battery packs 100, 102 and 104, 106 have switches 112 and 114, respectively, for alternately coupling the battery packs of each pair with an associated discrete electrical generating device 116, 118 driven by the free wheels 8g and 9g through associated gearboxes.

In operation, and as illustrated, battery pack 102 of battery pack pair 100, 102 is electrically coupled to drive motor 80 through switch 108 and wiring harness 120 to drive wheel 4g. Simultaneously, battery pack 100 of battery pack pair 100, 102 is electrically connected to the electrical generating device 116 via switch 112 and wiring harness 124 whereby battery pack 100 is charged during vehicle operation while battery pack 102 drives wheel 4g. Similarly, battery pack 106 drives electric motor 82 to drive wheel 5g through switch 110 and wiring harness 122. Simultaneously, battery pack 104 of the battery pack pair 104, 106 is being charged by electrical generating device 118 via switch 114 and wiring harness 126. Under computer, electrical or mechanical control, the switches 108, 110, 112 and 114 may be reversed, either simultaneously or in discrete pairs of switches 108, 112 and 110, 114 in accordance with the depletion rate of electrical charge on the battery powering the electric motor. Consequently, and for example, switch 108 and 112 may be reversed in position whereby driving power is supplied to motor 80 from battery pack 100 via switch 108, while battery pack 102 is being charged from electrical generating device 116 via switch 112. Similarly, by reversing switches 110 and 114, electric motor 82 may be driven from charged battery pack 104 via switch 110 and battery pack 106 may be recharged from the electrical generating device 118 via switch 114.

It is also to be understood that the embodiments described and illustrated herein may be applied to front-wheel or rear-wheel drive automobiles and, with the exception of the embodiment of FIG. 8, all other embodiments may also be applied to three-wheeled vehicles such as presently on the market. Mechanical devices required to accommodate the embodiments hereof to rear-wheel or front-wheel drive or three-wheeled vehicles, such as universal joints in the drive train, steering linkages or any similar devices well known and obvious to those practiced in this art are embraced within the present invention. It is also further understood that drive wheels may be gear-driven, belt-and-pulley-driven, or direct-driven as applicable. Similarly, the free-running wheels may transmit power to the generating device via gearbox(s) or transmission(s), belt and pulley(s) or direct drive as may be applicable.

It is to be further understood that the systems which alternately charge battery packs while a separate and discrete battery pack is delivering electrical power, as described herein, may be applied to other than vehicles. Other such applications include, but are not limited to, any electrically powered system dependent on storage batteries such as motorcycles, electric-powered windmills, electric driven irrigation pumps (a waterwheel turning the charging generator), electric powered airplanes (a second propeller or turbine rotating the generator), electric powered water craft (a second propeller rotating the generator), or electric powered farm or gardening equipment. It will also be appreciated that the term "generating device" as used herein embraces any electrical energy producing device, such as generators or alternators, along with any required electrical energy modifying means, such as voltage regulators.

It is still further to be understood that the term "gearbox" as used herein refers, as well, to transmissions (manual or automatic), variable speed gearboxes, constant output-speed gearboxes, and any other device which transmits rotational energy in a power- or charging-train, either directly or variably.

It is also to be understood that any electrical connections required for external charging, which may be needed to provide the vehicle's initial charge or if needed to recharge the battery packs should they discharge due to lack of use or other cause, may be provided with requisite electrical modifying means.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A power-generating system for an electric-powered vehicle having at least a pair of wheels, comprising:

at least first and second discrete battery packs for storing electrical energy;

an electrical generating device coupled to at least one of the wheels of the vehicle for generating electricity in response to rotation of said one wheel;

an electric motor connected to another of the wheels for driving said another wheel;

discrete battery-charging electrical circuits coupling said generating device and said battery packs including a first switch for selectively charging said first and second battery packs through the discrete battery charging electrical circuits, respectively;

discrete electrical driving circuits coupled to said electric motor and said battery packs including a second switch for electrically driving said motor using stored electrical energy (i) from said first battery pack when said first switch connects said generating device and said second battery pack and said second switch connects said motor and said first battery pack and (ii) from said second battery pack when said first switch connects said generating device and said first battery pack and said second switch connects said motor and said second battery pack, respectively.

2. A system according to claim 1 including an adjustable ratio gearbox interposed between said electrical generating device and said one wheel for driving said electrical generating device to provide electrical energy to said second battery pack at a predetermined rate.

3. A system according to claim 1 wherein said first and second switches enable said motor to draw electrical energy only alternately (a) from said first battery pack while said second battery pack is being electrically charged by said generating device and (b) from said second battery pack while said first battery pack is being electrically charged by said generating device.

4. A system according to claim 1 including a sensor for sensing the magnitude of the remaining electrical power stored in said first battery pack and switching said first switch to electrically connect said generating device and said first battery pack and switching said second switch mechanism to electrically connect said second battery pack and said electric motor in response to a predetermined remaining magnitude of sensed electric power stored in said first battery pack.

5. A system according to claim 1 including a sensor for sensing the magnitude of the electrical power stored in said second battery pack and switching said first switch to electrically connect said generating device and said first battery pack and switching said second switch to electrically connect said second battery pack and said electric motor in response to a predetermined magnitude of sensed electric power stored in said second battery pack.

6. A system according to claim 1 wherein said vehicle has a third wheel, a second electrical generating device coupled to said third wheel for generating electricity in response to rotation of said third wheel, said discrete battery charging electrical circuits coupling said second generating device and said battery packs, enabling said generating devices to supply electricity to said second battery pack when said first switch connects said generating devices to said second battery pack and to said first battery pack when said first switch connects said generating devices to said first battery pack.

7. A system according to claim 1 wherein said vehicle has third and fourth wheels, a second electrical generating device coupled to said third wheel for generating electricity in response to rotation of said third wheel, said electric motor being coupled to said fourth wheel when said motor is electrically driven using said stored electrical energy, said discrete battery charging electrical circuits coupling said second generating device and said battery packs, enabling said generating devices to supply electricity to said second battery pack when said first switch connects said generating devices to said second battery pack and to said first battery pack when said first switch connects said generating devices to said first battery pack.

8. A system according to claim 1 wherein each said battery pack includes a plurality of cells electrically connected to one another in series and through switch elements between adjacent serially connected cells, said switch elements being movable between open and closed switch positions, said switch elements in said closed positions enabling electrical connection between the electrical motor and the plurality of the cells of the battery pack in series to supply power to the electrical motor and in said open positions enabling electrical connection between the generating device and the individual cells of the battery pack for charging the cells in parallel.

9. A system according to claim 1 including a constant output-speed gearbox interposed between said electrical generating device and said one wheel for driving said electrical generating device to provide electrical energy via said battery charging electrical circuits to said battery packs.

10. A system according to claim 1 wherein said vehicle has a third wheel and a second electric motor connected to said third wheel, said electrical driving circuits coupled to said second electrical motor whereby said second electrical motor drives said third wheel using stored energy (i) from said first battery pack when said first switch connects said generating device and said second battery pack and said second switch connects said motor and said first battery pack and (ii) from said second battery pack when said first switch connects said generating device and said first battery pack and said second switch connects said motor and said second battery pack, respectively.

11. A power-generating system for an electric-powered vehicle having at least a pair of wheels, comprising:

at least first and second discrete battery packs for storing electrical energy;

an electrical generating device coupled to at least one of the wheels of the vehicle for generating electricity in response to rotation of said one wheel;

an electric motor connected to another of the wheels for driving the another wheel;

discrete battery-charging electrical circuits coupling said generating device and said battery packs, including a first switch for selectively charging said first and second battery packs through the discrete battery charging electrical circuits, respectively;

discrete electrical driving circuits coupled to said electric motor and said battery packs, including a second switch for electrically driving said motor using stored electrical energy from a selected one of said battery packs; and means for alternating between (i) charging one of said first and second battery packs and powering said electric motor using stored electrical energy from another of said first and second battery packs and (ii) charging said another of said first and second battery packs and powering said electrical motor using stored electrical energy from said one of said first and second battery packs.

12. A system according to claim 11 including means for driving said electrical generating device to provide electrical energy to the battery at a predetermined rate in excess of the rate of electrical energy drawn by the battery powering the electrical motor.

13. A system according to claim 11 wherein each said battery pack includes a plurality of cells electrically connected to one another in series and through switch elements between adjacent serially connected cells, said switch elements being movable between open and closed switch positions, said switch elements in said closed positions enabling electrical connection between the electrical motor and the plurality of the cells of the battery pack in series to supply power to the electrical motor and in said open positions enabling electrical connection between the generating device and the individual cells of the battery pack for charging the cells in parallel.

14. A power generating system for an electric-powered vehicle having at least a pair of wheels, comprising:

at least first and second discrete battery packs for storing electrical energy;

an electrical generating device coupled to at least one of the wheels of the vehicle for generating electricity in response to rotation of said one wheel;

an electric motor connected to another of the wheels for driving the another wheel;

discrete battery-charging electrical circuits coupling said generating device and said battery packs for selectively charging said first and second battery packs through the discrete battery charging electrical circuits, respectively;

discrete electrical driving circuits coupled to said electric motor and said battery packs for electrically driving said motor using stored electrical energy selectively from said first and second battery packs;

each said selected battery-charging circuit being electrically independent of each said selected electrical driving circuit affording electrical disconnection between said electrical generating device and said electric motor when powering said vehicle.

15. A system according to claim 14 wherein each said selected battery-charging circuit is electrically independent of each said selected electrical driving circuit affording electrical disconnection between said electrical generating device and said electric motor when charging the battery packs.

16. A system according to claim 14 including an adjustable ratio gearbox interposed between said electrical generating device and said one wheel for driving said electrical generating device to provide electrical energy to said second battery pack.

17. A system according to claim 14 including means for alternating between (i) charging one of said first and second battery packs and powering said electric motor using stored electrical energy from another of said first and second battery packs and (ii) charging said another of said first and second battery packs and powering said electrical motor using stored electrical energy from said one of said first and second battery packs.

18. A system according to claim 14 wherein each said battery pack includes a plurality of cells electrically connected to one another in series and through switch elements between adjacent serially connected cells, said switch elements being movable between open and closed switch positions, said switch elements in said closed positions enabling electrical connection between the electrical motor and the plurality of the cells of the battery pack in series to supply power to the electrical motor and in said open positions enabling electrical connection between the generating device and the individual cells of the battery pack for charging the cells in parallel.

19. A method of powering a vehicle comprising the steps of:
   (a) electrically connecting at least one of a plurality of discrete battery packs having stored electrical energy to an electric motor to drive a wheel of a vehicle and thereby drive the vehicle;
   (b) generating electrical energy in an electrical generating device in response to rotation of another wheel of the vehicle;
   (c) electrically connecting the electrical generating device to a battery pack different than the battery pack in electrical connection with the electric motor to charge said different battery pack;
   (d) electrically disconnecting said one battery pack and said electric motor;
   (e) electrically connecting another of said battery packs to said electric motor to drive the wheel of the vehicle and thereby drive the vehicle;
   (f) electrically disconnecting the electrical generating device from said different battery pack;
   (g) electrically connecting the electrical generating device with said one battery pack to charge said one battery pack; and
   (h) electrically connecting and disconnecting the battery packs and the electric motor and electrically connecting and disconnecting the electrical generating device and the battery packs such that the same battery pack is disabled from simultaneously being charged and driving the electric motor.

* * * * *